Nov. 10, 1959   D. C. GREEN   2,912,001
CHECK VALVES
Filed April 4, 1955
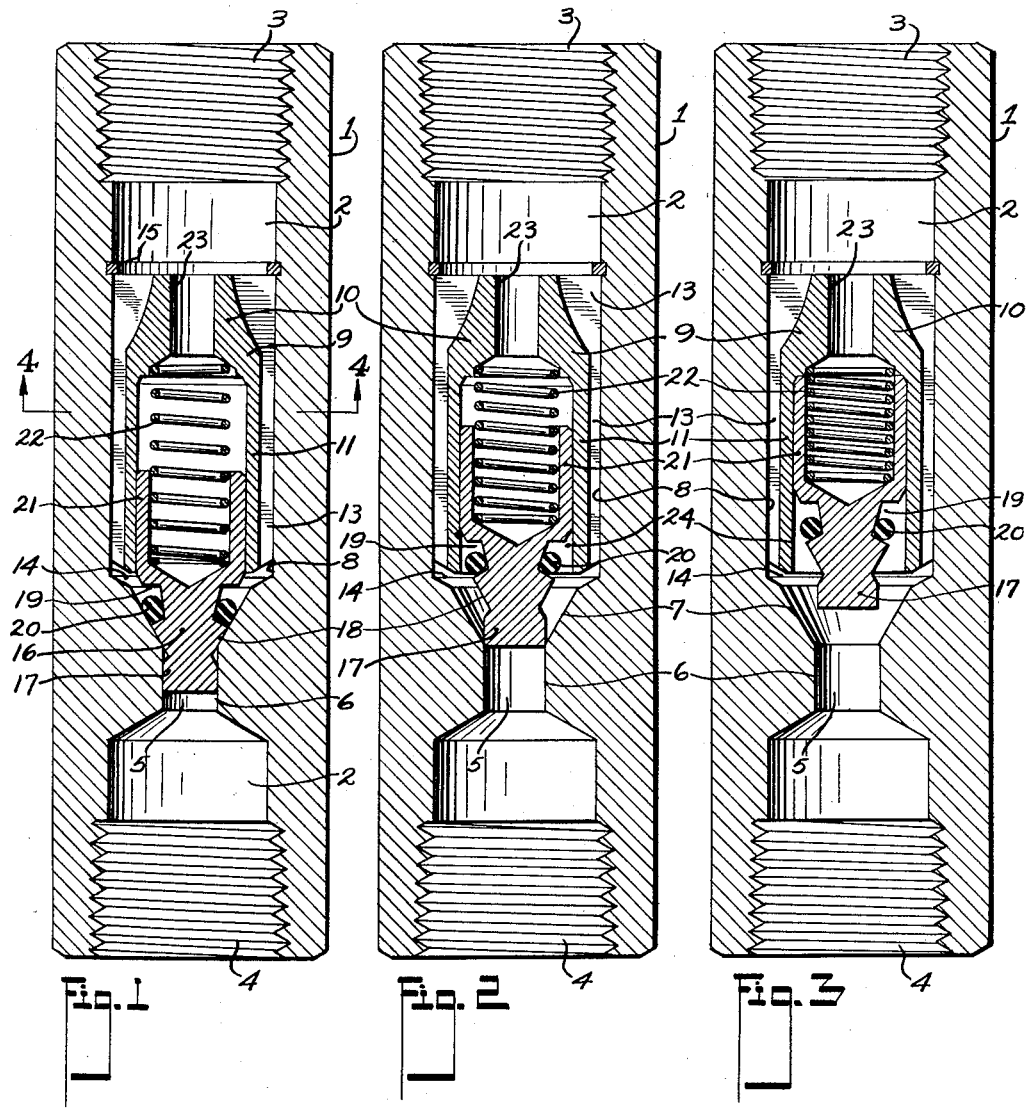
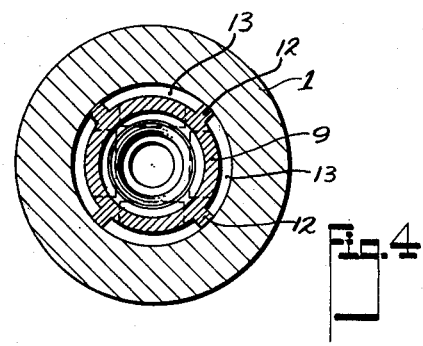
INVENTOR.
Donald C. Green
BY
Harry P. Canfield

2,912,001

CHECK VALVES

Donald C. Green, Russell, Ohio

Application April 4, 1955, Serial No. 499,111

7 Claims. (Cl. 137—516.29)

This invention relates to valve devices for controlling the flow of fluid, and relates particularly to check valve devices of the type that comprise a valve port and a valve to open the port to permit flow therethrough in a forward direction, and to close the port to prevent flow in the backward or reverse direction.

In some check valve devices of this class a valve is provided to fit upon a valve port seat, to close the valve port, and cut off the flow but is not expected to absolutely seal the port, and an O-ring of rubber or the like is provided for sealing purposes.

When such valve devices as ordinarily made, operate to open the port and unseal the O-ring, the flow of fluid through the port impinges on the O-ring. In many cases the flow is at such high velocity that, in the absence of countervailing provisions, it will mutilate the O-ring or even tear it out of its mounting.

In my Patent No. 2,481,482 is described a check valve of this type in which the O-ring is mounted in such manner that when the fluid flow first impinges on it, it is moved thereby to a position in which the fluid no longer impinges directly upon it, and the effect of the impingement is reduced so materially, that in many fields of use, this check valve has operated satisfactorily over long periods of time without damage to the O-ring or deterioration of the sealing effectiveness thereof.

O-rings for such check valves are for varying reasons made from synthetic rubber. Silicone rubber has properties which make it superior material for O-rings particularly in cases in which the fluid is such as would act chemically on other ring material; for example oxidation of the ring when the fluid is oxygen. But silicone O-rings are physically fragile and when the fluid flows through the valve at high pressure its velocity, if it contacts the O-ring, may break it or otherwise destroy its sealing usefulness.

The problem thus presented is solved by the present invention, of devising a check valve the uses of which are not limited by nor dependent upon the physical strength of the ring material, so that there may be a free choice of a ring material best adapted to the characteristics of the fluid to be controlled.

Also, most synthetic materials for check valve O-rings deteriorate with time, and this reduces the physical strength of the O-ring; so that in certain installations such as those of the U.S. Air Force, a regular time schedule is followed for replacement of the O-ring.

The solution of said problem, by the present invention, by rendering the functioning of the O-ring independent of its physical strength, greatly lengthens the useful life of the check valve before replacement becomes expedient.

The check valve of the present invention may be considered as an improvement over that of said patent, in that it provides a more complete protection of the O-ring from the effects of fluid at high velocity flowing through the valve when it opens.

An object of the invention is to provide in a check valve, improved protection of the O-ring in the respects referred to.

Again, in check valves of this general class in which a coiled compression spring is used to normally hold the valve closed, it has been found that if the forward flow when the valve opens is at a very high velocity, and if it impinges or flows over or through the spring, it will in some cases displace or distort or mutilate the spring, or otherwise interfere with its intended action.

It is therefore another object of the invention to provide a check valve of the class referred to having a valve closing spring, in which the spring is disposed so as to be entirely out of the path of flow through the valve.

Hereinafter two constructions of check valve are set forth embodying the invention; and the invention may be defined as comprising, in general, the following.

The valve in each of said embodiments comprises two elements, one a primary element to close and open the valve port, and the other an O-ring element to seal and unseal it. Assuming that the port is closed and sealed by the respective elements and that the flow pressure occurs to open the valve, the O-ring element breaks the seal but leaves the port still closed, and leaving the flow shut off by the primary element, and the O-ring moves into the open end of a tubular guard and is surrounded by it.

Then the primary element moves to open the port, and flow through the port has no flow path into the tubular guard but is directed over the outside of it and does not impinge upon or flow over the O-ring within it. The full protection of the O-ring, one of the primary purposes of the invention, is thus accomplished.

The primary valve element is held in the open-port position by the forward flow, against the force of a spring. Upon the occurrence of back flow and closing of the port, the force of the forward flow first dies out and the spring moves the primary element to close the port before any considerable back flow can develop and therefore whether or not the O-ring element remains within and guarded by the tubular guard until after the port is closed, is immaterial.

Another object of the invention is to provide a check valve construction comprising means having the mode of operation described, generally, above.

The invention is fully disclosed in the following description taken in connection with the accompanying drawing in which:

Figs. 1, 2 and 3 are longitudinal sectional views of an embodiment of the invention, showing parts thereof in different positions;

Fig. 4 is a cross sectional view from the plane 4—4 of Fig. 1.

Referring to the drawings there is shown at 1 an elongated housing having in general a passageway 2 therethrough; the passageway at its upper and lower ends 3 and 4 being threaded for connection to conduits.

At an intermediate part of the general passageway it is constricted to provide a valve port 5 which comprises a cylindrical portion 6 continuing upwardly into an outwardly flared conical portion 7 which may be referred to as a port seat, and beyond which the diameter of the passageway is increased to provide a cylindrical receptacle wall 8 for a cage 9.

The cage 9 comprises a head 10 from which a tubular wall 11 extends downwardly, open at its lower end.

The head 10 and tubular wall 11 have exterior, longitudinal, circumferentially spaced ribs 12 thereon fitting within the cage receptacle wall 8 and providing longitudinal flow passages 13 between the ribs.

The cage is positioned longitudinally in the receptacle wall 8 so that the lower end of the tubular wall 11 is spaced from the conical port seat 7 as at 14, providing a flow path from the valve port 5 outwardly radially through said space 14 over the end of the tubular wall 11 and upwardly through the flow passages 13.

This position of the cage is determined by a snap ring 15 seated in a groove in the receptacle wall 8 upon which the upper end of the cage head 10 abuts.

A valve structure indicated generally at 16 is reciprocably mounted within the cage and on its lower end has a cylindrical valve 17 reciprocable into the port 5 to close it as in Fig. 1 and out of the port to open it as in Fig. 3.

Above the valve 17 is a conical surface 18 formed at the same cone angle as the conical port seat 7.

Above the conical surface 18 is a groove 19 the bottom of which is conical, downwardly converging. An O-ring 20 is mounted in the groove 19. As shown in Fig. 3 it engages the groove bottom and its outer periphery extends slightly beyond the conical surface 18. The groove is wider than the sectional diameter of the O-ring to allow for bulging of the ring upon being compressed in operation to be described.

Above the groove 19 is an upwardly extending skirt 21 which fits the inside of the tubular wall 11 of the cage to be guided for longitudinal reciprocatory movement therein.

A coiled compression spring 22 is disposed within the valve skirt 21 and reacts between the valve and the cage head 10 to exert downward force on the valve 16.

An aperture 23 through the cage head 10 communicates between the upper end 3 of the main passageway and the valve 16 within the cage wall 11.

Fig. 1 shows the valve device functioning as a check valve.

The spring 22 reacts to hold the cage 9 up against the snap ring 15 and to hold the valve structure 16 downwardly with the valve 17 in the cylindrical portion 6 of the port and closing it so that when back pressure occurs, in the upper end 3 of the main passageway, its flow path is cut off at the port 5 by the valve 17.

When back pressure occurs it is communicated through the aperture 23 and forces the valve structure 16 down and the conical surface 18 of the valve structure is stopped on the conical port seat 7. This compresses the O-ring 20 upon the conical port seat 7 making a seal thereat.

As is apparent, the O-ring is subjected to the back pressure communicated to the ring through the flow passages 13 and the greater the pressure upon it the more effectively it seals.

Assuming now that forward pressure at the lower end 4 of the main passageway occurs sufficient to open the valve port for upward flow. This forward pressure is on the lower end of the valve 17 in Fig. 1 and raises the valve structure 16 as a whole compressing the spring 22. Fig. 2 shows the parts just before the valve 17 actually opens the port 5, and therefore at this time the flow is still cut off by the valve 17 in the cylindrical portion 6 of the port 5.

The upward movement of the valve structure 16 to the position of Fig. 2 has carried the O-ring upwardly so far that it is within the lower end of the tubular wall 11 of the cage 9. The O-ring is in effect now within a recess 24, the tubular wall 11 constituting the side wall of the recess.

The valve continues to be moved upwardly and leaves the position of Fig. 2 and goes to that of Fig. 3. The valve 17 thus opens the port 5 and forward flow occurs. As shown in Fig. 3, the only flow path is from the port 5 laterally through the space 14 and upwardly through the passages 13 provided by the cage. The force of the flow on the lower end of the valve 17 moves the valve and the O-ring still farther up inside the tubular wall 11 of the cage. The O-ring is therefore entirely out of the path of the flow and no matter how high the pressure or the velocity of the flow, the O-ring is fully protected from its effects.

It will be noted that the O-ring moves into the protection of said recess 24 or lower end of the tubular wall 11 before the main flow is initiated by opening of the part 5 by the valve 17.

When the forward flow stops, the spring 22 immediately moves the valve down successively to the positions of Figs. 2 and 1, first cutting off the flow path at the port 5 of the valve 17. It is after this that the O-ring emerges from its protecting wall, and as it moves down to sealing position, there is no flow impinging on it that might damage it.

The cage 9 is free to move upwardly and downwardly. In normal condition of the parts it will be held upwardly against the snap ring 15 by the spring 22, as described and upon occurrence of forward flow will remain in this position. Upon the occurrence of back pressure the upper end of the cage 9 will be subjected thereto, and this may move the cage downwardly so that the lower end of the tubular wall will engage the port seat 7, and this, by closing the space 14 will cut off back pressure flow. This may occur before the valve portion 17 enters the port to cut off back flow.

This is a distinct advantage in instances in which the fluid being controlled contains foreign matter that might make the valve structure 16 tend to stick and not be returned downwardly immediately by the spring 22 when forward flow stops. If the valve should stick as here referred to, then the back pressure would first move the cage down to cut off the flow and then the full force of the back pressure would be exerted on top of the valve 16 and break it loose and force it down to the cut off and sealed position.

The cylindrical valve 17 is the primary valve element to close and open the port 5. The conical surface 18 engageable with the conical port seat 7 while having the appearance of constituting a valve and valve seat, are not intended to function as a valve, but are for the following purpose. When the valve is closed as a check valve, and as in Fig. 1, the O-ring is subjected to back pressure on its upper side as referred to. It will be compressed by the back pressure and if there is any crack or clearance crevice adjacent to it, it will be extruded into such crevice and thereby mutilated. The provision of the surfaces 18 and 7, both conical at the same cone angle, is the most convenient way to close the under side of the O-ring groove 19 without a crevice under the O-ring.

The spring 22 will be seen to be at all times surrounded by the tubular wall 11 of the cage 9; and is therefore protected against damage due to impingement of fluid flow upon it as referred to hereinbefore; and in the form of Figs. 5 to 8 the spring 55 is likewise protected since the flow is through the passages 50 between the ribs 47 of the cage, and the spring 55 is laterally outside of this path, the funnel form shroud 51 providing a barrier or flow deflector between this path of flow and the spring, as plainly shown in the drawing.

In the drawing, the devices have been shown in one upright position of use, and, in the description, movements and directions are described as upward and downward or the like; but it is to be understood that this has been done to simplify the disclosure; and that the disclosed devices may be used in any position.

The invention is not limited to the exact details of construction shown and described. Changes and modifications may be made by those skilled in the art and the invention is comprehensive of all such changes and modifications that come within the scope of the appended claims.

I claim:

1. A check valve structure comprising a housing and means providing a valve port therein; valve means in two parts connected together, namely, a first part movable to close and open the port and a second part comprising a sealing element of rubber or like compressible material movable to seal and unseal the port; the valve parts when in port closing and sealing positions, being movable in unison to open and unseal the port in response to fluid pressure communicated thereto through the port from a conduit communicating with the port; means causing the second part to move the sealing element to unseal the port before the first part opens the port; means providing an open-end tubular wall into and beyond the open end of which the sealing element moves upon unsealing movement thereof before the first part opens the port; means causing flow of fluid occurring through the port from said conduit when the port is subsequently opened by the first part, to go around the outside of the tubular wall and out of flow contact with the sealing element, and means positively securing said tubular wall against any movement in said housing in the direction of said fluid pressure and responsive thereto.

2. A check valve structure comprising a housing and means providing a valve port therein; valve means in two parts connected together, namely, a first part movable to close and open the port and a second part comprising a sealing element of rubber or like compressible material movable to seal and unseal the port; the valve parts when in port closing and sealing positions, being movable in unison to open and unseal the part in response to fluid pressure communicated thereto through the port from a conduit communicating with the port; means causing the second part to move the sealing element to unseal the port before the first part opens the port; means providing an open recess into which the sealing element moves upon unsealing movement thereof before the valve part opens the port; means causing flow of fluid through the port from said conduit when the port is subsequently opened by the first part, to flow laterally of the recess without entering it and out of flow contact with sealing element, and means positively securing said recess providing means against any movement in said housing in the direction of said fluid pressure and responsive thereto.

3. A check valve structure comprising a housing with a passageway therethrough formed at its ends for connection into a fluid conduit line; the passageway constricted at a longitudinally intermediate point to provide a valve port, having a circumscribing wall; movable valve means in the passageway; means guiding the valve means for longitudinal reciprocatory movement; the valve means comprising two parts connected together, one part formed to close and open the port and the other part comprising means carrying a rubber or like O-ring engageable with and disengageable from the wall of the port to seal and unseal the port, upon reciprocatory movements of the parts; a spring within the housing tending to reciprocate the two connected parts to port closing and sealing positions; the two connected parts movable in unison to unseal and open the port by fluid pressure communicated thereto through the port from a conduit connected to the housing; means causing the O-ring to move to unseal the port before the said one part opens the port, and means providing a tubular guard into the open end of which the O-ring moves upon unsealing the port before the one part opens the port; means causing pressure effected fluid flow through the port occurring upon opening of the port, to go around the outside of the tubular guard, and out of flow contact with the O-ring, and means positively securing said tubular guard against any movement in said housing in the direction of said fluid pressure and responsive thereto.

4. A check valve structure comprising a housing with a passageway therethrough formed at its ends for connection in a fluid conduit line; the passageway constricted at a longitudinally intermediate point to provide a valve port, having a circumscribing wall; movable valve means in the passageway; means guiding the valve means for longitudinal reciprocatory movement; the valve means comprising two parts connected together, one part formed to close and open the port and the other part comprising means carrying a rubber or like O-ring engageable with and disengageable from the wall of the port to seal and unseal the port, upon reciprocatory movements of the parts; a spring within the housing tending to reciprocate the two connected parts to port closing and sealing positions; the two connected parts being movable in unison to unseal and open the port by fluid pressure communicated thereto through the port from a conduit connected to the housing; means causing the O-ring to move to unseal the port before the said one part opens the port, and means providing an open recess into which the O-ring moves upon unsealing the port before the one part opens the port; means causing pressure effected flow through the port occurring upon opening of the port to flow laterally of the recess without entering it, and out of flow contact with the O-ring, and means positively securing said recess providing means against any movement in said housing in the direction of said fluid pressure and responsive thereto.

5. A check valve device comprising a walled housing open at opposite portions, and having an intermediate transverse wall with a valve port therethrough; an elongated tubular wall supported within the housing and spaced from the housing wall and with its lower open end spaced from the transverse wall; a valve body mounted in the tubular wall, for up and down reciprocatory movement, and carrying a valve element which normally closes the port and has initial upward movement with the body while maintaining the port closed and opens the port after said initial upward movement; and carrying an O-ring element normally sealing the port and movable upwardly to unseal it upon initiation of said upward movement of the valve body; a spring within the tubular wall urging the valve body to move downwardly and maintain the port closed and sealed; the valve body being movable upwardly by fluid pressurre below the transverse wall and in the port; the valve element and O-ring element being spaced on the body so that the valve body upon moving upwardly carries the O-ring into the tubular wall before the valve opens the port; opening of the port by the valve providing a flow path through the port, laterally under the end of the tubular wall and in the space outside the tubular wall; the valve body filling the tubular wall transversely and blocking all flow upwardly into the tubular wall.

6. A check valve device comprising a housing with a fluid flow port therein; a valve body in the housing mounted for reciprocatory movement downwardly toward and upwardly from the port and carrying a valve element to correspondingly close and open the port and carrying an O-ring element above the valve element, to correspondingly seal and unseal the port; means providing a downwardly open recess above the port into which the O-ring is carried by upward movement of the valve body and before it opens the port; the recess having a lateral wall that deflects flow through the open port laterally away from the recess, and means positively securing said recess providing means against any movement in said housing in the direction of opening of said valve element and responsive to fluid from said port.

7. A check valve device comprising a housing with a fluid flow port therein; means providing a tubular wall having an open end axially aligned with and above the port; a valve body supported within the tubular wall, for reciprocatory movement downwardly toward and upwardly from the port and carrying a valve element to correspondingly close and open the port and carrying an O-ring element above the valve element to correspondingly seal and unseal the port; the valve body filling the tubular wall transversely; the valve body carrying the O-ring upwardly into the tubular wall upon upward movement of the body and before it opens the port, and means positively securing said tubular wall against any movement in said housing in the direction of flow through said port and responsive thereto.

References Cited in the file of this patent

UNITED STATES PATENTS

| | | |
|---|---|---|
| 1,693,177 | Hodgart | Nov. 27, 1928 |
| 1,710,635 | Wertz | Apr. 23, 1929 |
| 2,431,437 | Van Der Werff | Nov. 25, 1947 |
| 2,481,482 | Green | Sept. 13, 1949 |
| 2,488,075 | Bridwell | Nov. 15, 1949 |
| 2,595,012 | Smith | Apr. 29, 1952 |
| 2,666,614 | Grove | Jan. 19, 1954 |
| 2,720,219 | Grove | Oct. 11, 1955 |